US007383531B2

(12) United States Patent
Brigham, II et al.

(10) Patent No.: US 7,383,531 B2
(45) Date of Patent: Jun. 3, 2008

(54) EXTENSIBLE PRODUCTIVITY TOOL FOR EXPOSING COMMON CLASSES IN APPLICATION BUILDING

(75) Inventors: Robert Allan Brigham, II, Woodinville, WA (US); Shamez Rajan, Bothell, WA (US); Joseph Tyler Whitney, Kirkland, WA (US); Paul Stanley Kuklinski, Jr., Bellevue, WA (US); John J. Rivard, Redmond, WA (US); James Roy Schmelzer, Jr., Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 681 days.

(21) Appl. No.: 10/767,543

(22) Filed: Jan. 29, 2004

(65) Prior Publication Data

US 2005/0172265 A1 Aug. 4, 2005

(51) Int. Cl.
*G06F 9/44* (2006.01)
*G06F 9/45* (2006.01)

(52) U.S. Cl. .............. 717/107; 717/108; 717/111; 717/140; 717/158

(58) Field of Classification Search .............. None
See application file for complete search history.

(56) References Cited

U.S. PATENT DOCUMENTS

| 6,199,195 | B1 * | 3/2001 | Goodwin et al. ........ 717/104 |
| 6,298,476 | B1 | 10/2001 | Misheski et al. |
| 6,434,739 | B1 | 8/2002 | Branson et al. |
| 6,513,152 | B1 | 1/2003 | Branson et al. |
| 6,598,035 | B2 | 7/2003 | Branson et al. |
| 6,654,951 | B1 | 11/2003 | Bacon et al. |
| 6,684,384 | B1 | 1/2004 | Bickerton et al. |
| 6,961,750 | B1 * | 11/2005 | Burd et al. .............. 709/203 |
| 2002/0038451 | A1 * | 3/2002 | Tanner et al. ............ 717/105 |
| 2005/0055681 | A1 * | 3/2005 | Gadre .................... 717/146 |

OTHER PUBLICATIONS

M.E. Markiewicz and C.J.P. De Lucena. Object Oriented Framework Development. ACM Crossroads, vol. 7 Issue 4, pp. 3-9, 2001.
R. Furicht, H. Prahofer, T. Hofinger, and J. Altmann. A Component-based Application Framework for Manufacturing Execution Systems in C# and .NET. In Proc. 40th International Conference on Technology of Object-Oriented Languages and Systems, vol. 10, pp. 169-178, 2002.
A. Ortigosa, M. Campo, and R. Moriyon. Towards Agent-oriented Assistance for Framework Instantiation. Proceedings of the 15th ACM SIGPLAN Conference, pp. 253-263, 2000.

* cited by examiner

*Primary Examiner*—Chuck Kendall
(74) *Attorney, Agent, or Firm*—Amin, Turocy & Calvin, LLP

(57) ABSTRACT

Architecture for developing an application. The architecture provides an entry point to commonly used classes of an application development framework. A developer begins a project which predefines a set of collection classes. An exposer component includes an identifier component and a compiler for generating accessors to the collected classes. The identifier uses an attribute on a collection class which a compiler dynamically extracts in order to generate accessors to the desired collected classes and compiles the generated collection classes for use in the namespace.

32 Claims, 7 Drawing Sheets

EXTENSIBLE PRODUCTIVITY TOOL FOR EXPOSING COMMON CLASSES IN APPLICATION BUILDING

TECHNICAL FIELD

This invention is related to an application development framework, and more specifically, to a framework that provides an access point to commonly used building blocks.

BACKGROUND OF THE INVENTION

Application development is becoming increasingly time-consuming as the amount of code and sophistication of program features become more complex. Such complexities impact development time, and can result in more software bugs that eventually impact user acceptance of the application product. Moreover, delays in delivering applications to market due to delays in application development further impact the bottom-line of software vendors.

Conventional application development programs include libraries of object code that is needed to build an application and use the application. This can be a problem for the programmer when seeking out specific functionality during application development.

In some development frameworks, building applications is all about using the underlying framework classes. Due to the size of the framework, and the organization of various classes in it, developers can find it difficult to learn and use. There can be are hundreds of namespaces and each of them has a significant number of classes. Classes that are needed on an everyday basis are mixed with other classes that are not needed as often. Thus, it becomes a challenging task to look for a class for a simple task. Moreover, to achieve that simple task, developers need to use a combination of classes, which makes it even more difficult to use.

What is needed is an improved application development framework.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises a system that facilitates building an application within a development framework, the system comprising an exposer component that exposes a set of classes, which set includes at least one of a framework class of the framework and a project class of a project, and which at least one of the framework class and the project class is used to develop the application. The set of classes includes at least one of a class related to a computing device on which the application will be run, a class that provides information about the application, an object that provides information about a user that runs the application, and a class that is commonly used in the project. The class that is commonly used is related to one of a form, a web service, a resource, and a setting.

In another aspect thereof, the exposer component facilitates creation of a namespace that provides hierarchical access to instances of classes that are commonly used to develop the application.

In yet another aspect of the present invention, the system is extensible such that a new class can be exposed that is provided in accordance with at least one of an expansion of the framework and an improvement to the framework.

In still another aspect thereof, there is provided a system that facilitates building an application within a development framework. The system comprises a compiler that compiles code, and an identification component that specifies search information related to class information of a class to be identified, which identification component signals the compiler to search the code based on the search information and collect the classes so identified. A compiler associates an attribute with class information during compilation of the code. The attribute is associated with a container class that the compiler will generate properties within to return the gathered types. A compilation constant indicates whether the attribute is used to gather a specific type or not. The attributed class information is pulled out and compiled separately with respect to compiling the code. The class is generated dynamically, and includes strong types and bounded access that points only to an object of the class. The process begins with source code in which a class has been attributed with information that indicates a base type that will identify all those types for which to generate accessors within the grouping class. For a class thus attributed, the compiler searches for types that derive from the type specified and generates properties and fields in order to return instances of the discovered classes.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
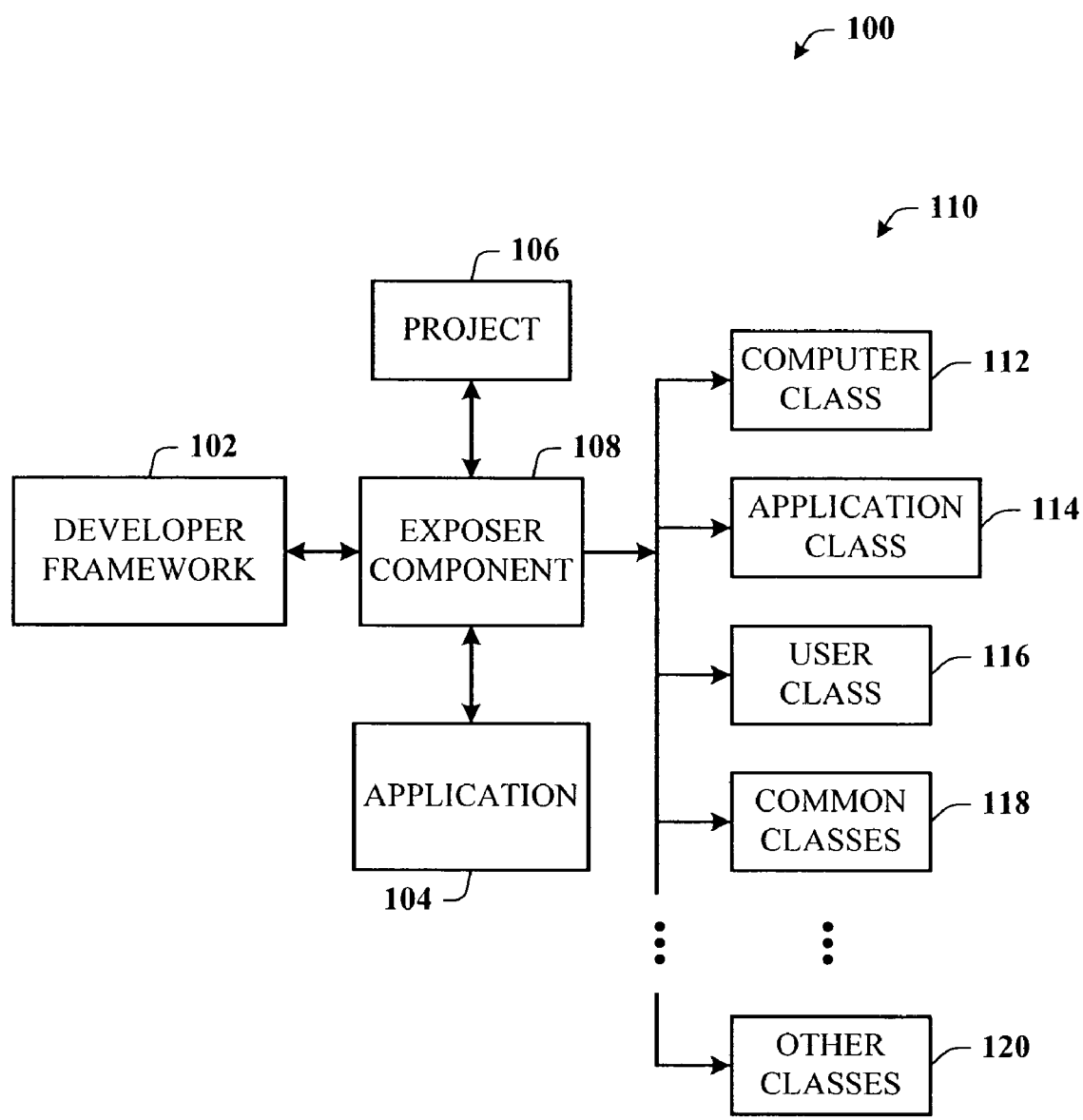
FIG. 1 illustrates a block diagram of an application development system of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Referring now to FIG. 1, there is illustrated a block diagram of an application development system 100 of the present invention. The system 100 includes a development framework 102 from within which a developer can build an application 104. The developer begins by creating a project 106 within the development framework 102. The system 100 of the present invention further includes an exposer component 108 that facilitates exposing classes and/or objects of the framework 102 and project 106. The exposed classes and/or objects are grouped into a namespace that functions as a very simple and highly intuitive entry point to commonly used building blocks for building the application 104. The building blocks include commonly used classes in the framework 102, as well as common classes in the user's project 106. In some cases, the framework classes are wrapped in higher-level abstractions that are simpler for developers to understand. Note that the exposer component 108 can be included as part of the developer framework 102. Moreover, it is to be appreciated by one skilled in the art that the classes will be exposed within the framework 102 to facilitate building the application 104.

A set of classes 110 exposed through the namespace includes classes that are grouped as follows: a computer class 112 that includes objects that relate to a computer on which the application will run; an application class 114 that includes objects that provide access to information about the application itself; a user object 116 includes information about the user running the application; and common classes 118 that are enumerations of commonly used items in the user's project 106, which include forms, web services, resources (e.g., images, sounds, strings, and files), and configuration settings for the application 104.

The system 100 is extensible in that other classes 120 can be exposed as a result of expanding and improving the framework 102. The class grouping is not limited to the above-mentioned groups. As the underlying framework 102 grows, and as new APIs (application programming interfaces) come into existence, the namespace will continue to provide a simple and intuitive access to commonly used classes. As new classes come into existence, and qualify as candidates for the namespace, they will be added to the existing groups if they fit well into those groups. Otherwise, new groups may be added to the namespace for exposing the new classes.

One goal of the architecture of the present invention is to make the programming language used in the development process a productivity tool that facilitates rapid application development. Thus, developers can build fully functioning applications in the shortest time possible. The namespace is one of those productivity features that not only reduces the amount of source code a developer needs to write, but it also decreases the time required to discover commonly used building blocks for building the application 104.

Figure 2:
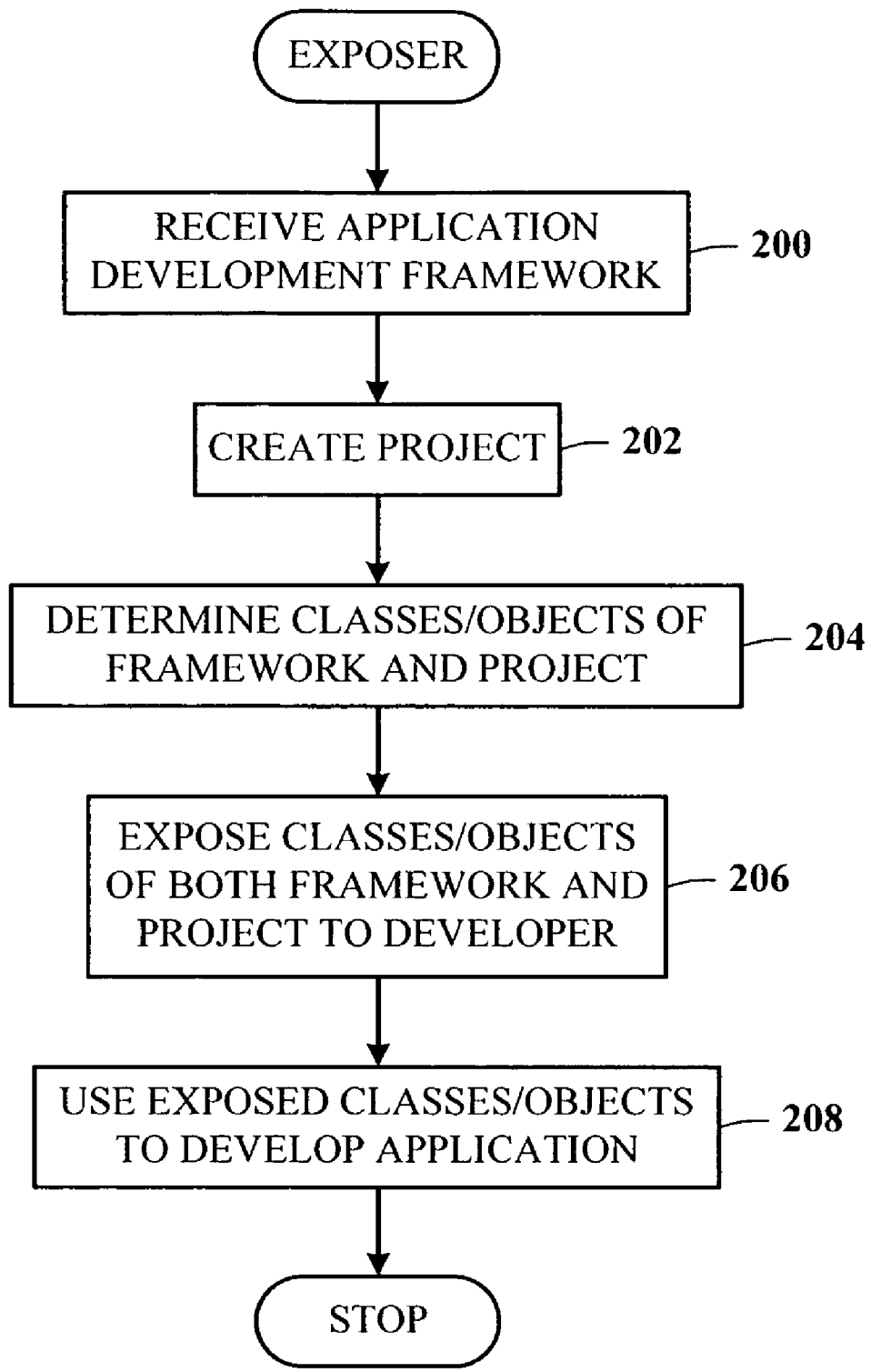
FIG. 2 illustrates a flow chart of a process for generating classes in accordance with the present invention.

Referring now to FIG. 2, there is illustrated a flow chart of a process for generating classes in accordance with the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, a user receives an application development framework. At 202, the user establishes a project for building the application using the development framework. At 204, the user identifies classes and/or objects of the framework and the project that will be needed to build the application. At 206, the classes and/or objects of the framework and project are exposed automatically. At 208, the exposed classes and/or objects are employed to build the application. The process then reaches a Stop block.

Figure 3:
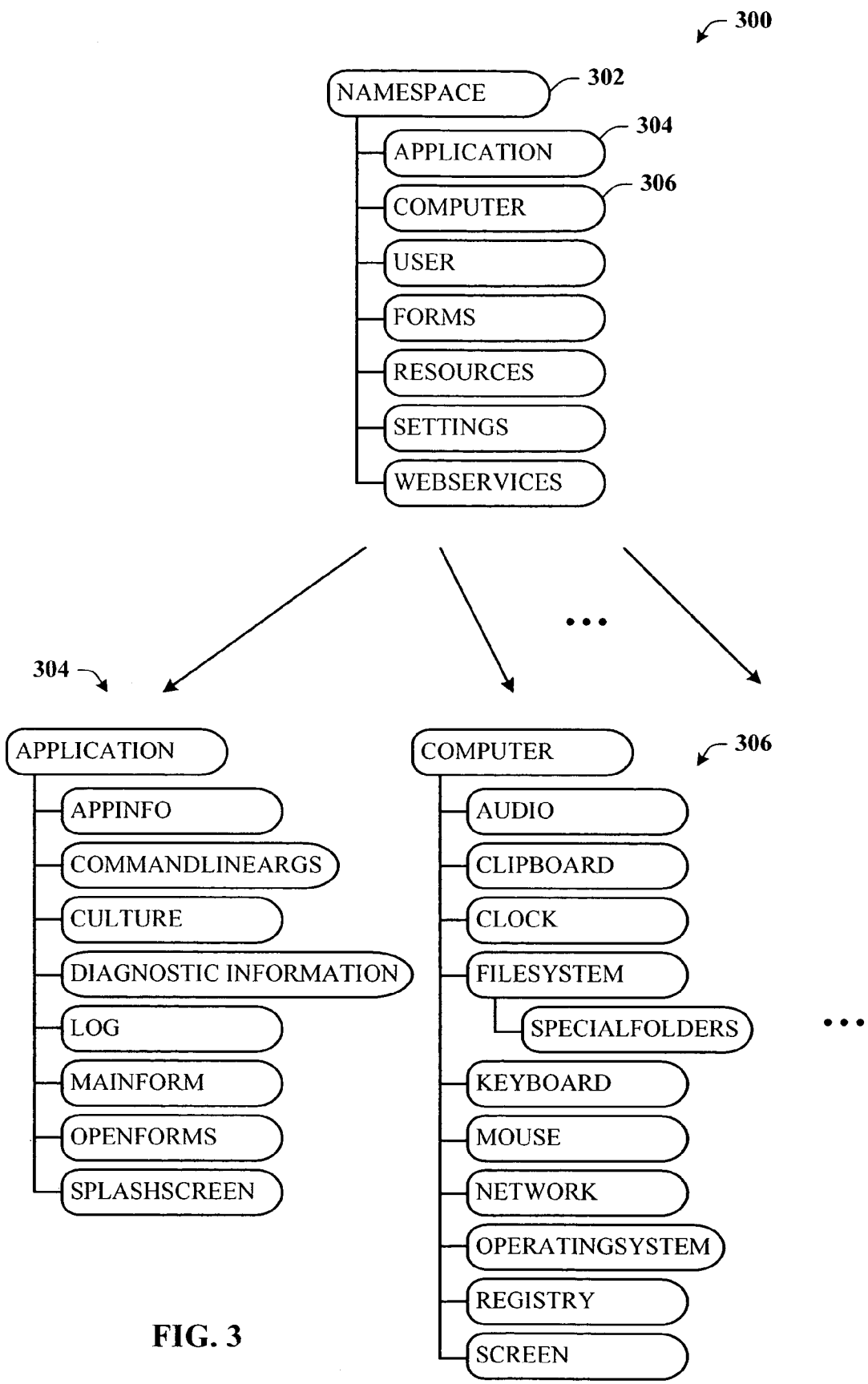
FIG. 3 illustrates a set of top-level classes that are exposed in accordance with the present invention.

Referring now to FIG. 3, there is illustrated a set of top-level classes 300 that are exposed in accordance with the present invention. The classes 300 are associated with a namespace 302 (denoted hereinafter as 'My') that is an entry point to commonly used building blocks for building the application. The namespace 302 provides a hierarchical access to instances of those commonly used classes. When the developer accesses the namespace 302, the developer will see a list of the top-level classes. These top-level classes have been chosen such that the items exposed through them are highly intuitive to discover.

The classes 300 of the namespace 302 are denoted as namespace.class, or My.Application, for example, and include an Application class 304, a Computer class 306, a User class, a Forms class, a Webservices class, a Resource class, and a Settings class. These can be a default set of classes. The extensibility model allows for the creation of a customized MY namespace, which means additional top level classes can be added to the MY namespace. Additionally, certain top level classes may be removed by adjusting a _MYTYPE compilation constant. The number of top-level classes is also controlled and set to most appropriately match the type of application being developed.

The Applications class 304 facilitates the access of information related to the current application. Items such as version, command-line arguments, environment variables, and log are exposed through this class. The Computer class 306 is associated with items related to the computer running the current application. These items can be accessed through this class. Printer, Screen, Registry, Network Access, File System, and Audio are among the objects accessible through this class.

The User object is associated with information related to the user running the current application. This information can be accessed through this class. The user's name, the capability to query whether the user is in a particular group, whether the user is authenticated, and what the type of authentication was. The Forms class serves as a strongly typed collection of instances of all forms in the current project. If a user has Form1 in their project, it can be accessed using Forms.Form1. This is an example of a top-level class that will be excluded when not appropriate, for example, when the user is developing an application that does not contain any forms.

The Webservices class serves as a strongly typed collection of instances of all web services referenced in the current project. Webservices.Searchname would be an instance of a Searchname web service, if it has been referenced in the user's project. The Resources class provides strongly typed access to all resources (e.g., images, strings, files, and sounds) in the current project. After the user adds some configuration settings to his/her project using a designer, the Settings class provides a strongly typed access to those settings during the runtime of the application.

The Application class 304 further includes the following objects that are exposed: Appinfo, Commandlineargs, Culture, Diagnostic information, Log, Mainform, Openforms, and Splashscreen. The classes exposed from Application can also vary based on the type of application being developed and is extensible.

The Computer class 306 further includes the following objects that are exposed: Audio, Clipboard, Clock, Filesystem with a Special Folders object, Keyboard, Mouse, Network, Operating system, Registry, and Screen.

Other classes of the namespace 302 can be exposed, but are not shown.

Figure 4:
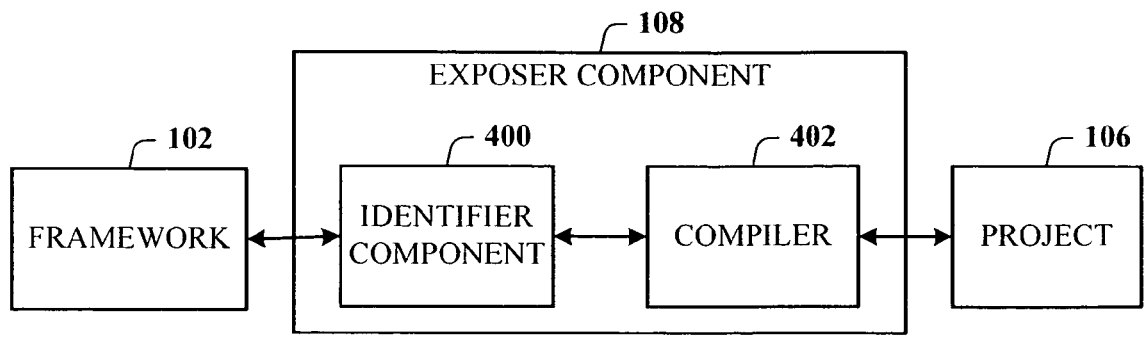
FIG. 4 illustrates a block diagram of the components of the exposer component of the present invention.

Referring now to FIG. 4, there is illustrated a block diagram of the components of the exposer component 108 of the present invention. The exposer component 108 can be considered to include an identifier component 400 and a compiler 402, both of which operate on the framework 102 and the project 106 to identify and compile those classes and/or objects for building the application.

Figure 5:
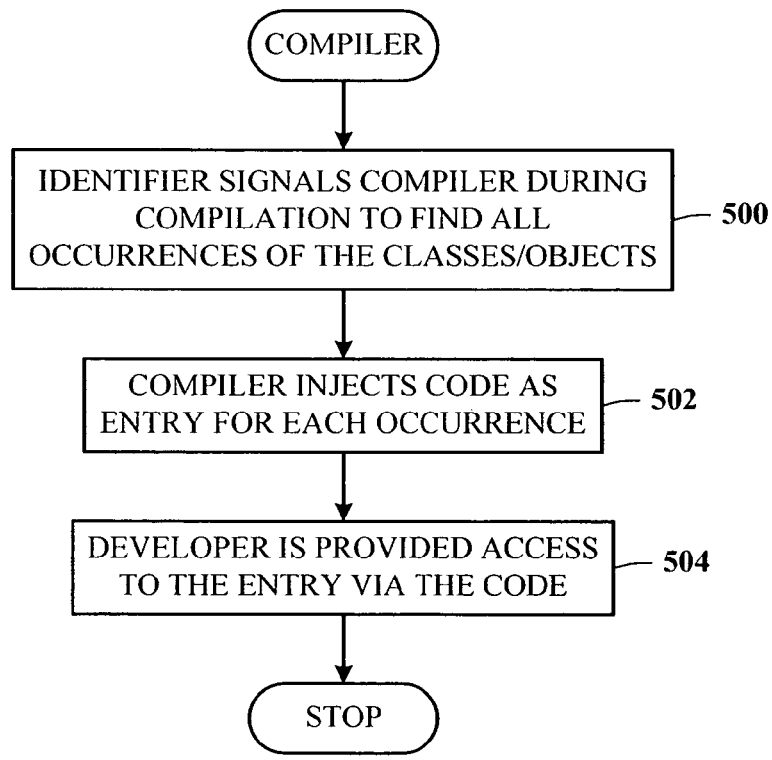
FIG. 5 illustrates a flow chart of a general process facilitated by a compiler, in accordance with the present invention.

Referring now to FIG. 5, there is illustrated a flow chart of a general process facilitated by a compiler, in accordance with the present invention. At 500, an identifier component of the exposer component signals the compiler during compilation to find all occurrences of the identified class/objects. At 502, the compiler injects code as an entry for each occurrence. At 504, the developer is provided access to the entry via the code. The process then reaches a Stop block.

Compiler

Following is a general example of what the compiler does with a group. In this example, the namespace is denoted 'My', and the class 'Forms' is a group class. It is declared as a 'MyGroup', for example, via an attribute 'MyGroupCollection'. The classes 'Form1' and 'Form2' are members of the MyGroup class Forms. The MyGroupCollection attribute indicates a base type, via a string, that identifies all types that will be gathered, since they derive from the indicated base type. The compiler uses the attribute arguments to collect together members of the group, and to generate the underlying code of the group. Basically, for each member, the compiler generates a property that gets or disposes an instance of the member class.

For the member 'Forms1' the generated code is: a public (support) field 'm_Form1' of type 'Form1' that keeps the member instance; and, a property named 'Form1' of type 'Form1'.

The 'get' method of the property calls the group generic method 'CreateInstance' to ensure an instance of type Form1 is available and returns the instance. The name 'CreateInstance' is provided by the second argument of the 'MyGroupCollection' attribute. The content of the method 'CreateInstance' can be customized for any particular group. The generic signature and return match the method from the example.

The 'set' method uses the method 'DisposeInstance' to dispose the instance of the class. The name 'DisposeInstance' is taken from the third argument of the 'MyGroupCollection' attribute. It is up to the MyGroup designer to determine the content of DisposeInstance. What is required by the compiler is the generic signature to match the example. The generated code in 'set' ensures the property can be set only to 'Nothing', and nothing is done when the property sets to itself.

```
<MyGroupCollection("System.Windows.Forms.Form", "CreateInstance",
"DisposeInstance")> _
Class Forms
    Private Function CreateInstance(Of T As Form)
    (ByVal Instance As T)
As T
        If Instance Is Nothing OrElse Instance.IsDisposed Then
            Return New T
        Else
            Return Instance
        End If
    End Function
    Private Sub DisposeInstance(Of T As Form) (ByRef Instance As T)
        Instance.Close( )
        Instance = Nothing
    End Sub
'___code generated by compiler
    public m_Form1 As Form1
    Public Property Form1( ) As Form1
        Get
            m_Form1 = CreateInstance(Of Form1) (m_Form1)
            Return m_Form1
        End Get
        Set(ByVal Value As Form1)
        If Value IS m_Form1
            Return
        End If
            If Value ISNOT Nothing Then
                Throw New ArgumentException("Property can
only be set to Nothing.")
            End If
            DisposeInstance(Of Form1) (m_Form1)
        End Set
    End Property
    public m_Form2 As Form2
    Public Property Form2( ) As Form2
        Get
            m_Form2 = CreateInstance(Of Form2) (m_Form2)
            Return m_Form2
        End Get
        Set(ByVal Value As Form2)
        If Value IS m_Form2
            Return
        End If
            If Not Value Is Nothing Then
                Throw New ArgumentException("Property can only
be set to Nothing.")
            End If
            DisposeInstance(Of Form2) (m_Form2)
        End Set
    End Property
'___End generated code
End Class
Class Form1
    Inherits Form
.....
End Class
Class Form2
    Inherits Form
.....
End Class
```

In order to have the compiler generate a group class, the compiled source code provides the following: an attribute MyGroupCollection, a class intended to act as a grouping class, and one or more class members.

MyGroupCollection

The attribute named 'MyGroupCollection' has the following definition:

```
<AttributeUsage(AttributeTargets.Class)> _
Public Class MyGroupCollectionAttribute
```

The attribute has a constructor with the signature:

```
Public Sub New(ByVal TypeToCollect As String, ByVal
CreateInstanceMethodName As String, ByVal
DisposeInstanceMethodName As String, ByVal DefaultInstanceAlias
As String)
```

The attribute 'MyGroupCollection' is intended to replace the existing attribute 'MyGroup', and may be renamed later as 'MyGroup'.

MyGroupCollection

The class intended to act as the 'MyGroup' class, includes a creator method, a disposer method, and a MyGroupCollection attribute added to the class.

The creator method has the following generic signature: "Function <name>(Of T As <base> & New( ))(ByVal Instance As T) As T". The method can be shared or an instance, depending on the implementation. The method returns a valid instance of T. If Instance is a valid instance of T, it will return it. If the input parameter Instance is a valid instance of T, it will return Instance; otherwise, it returns a new instance of T.

The disposer method has the following generic signature: "Sub <name>(Of T As <base>)(ByRef Instance As T)". The method may be shared or an instance, depending on the implementation. The disposer properly disposes Instance, and then sets Instance to Nothing, which will be copied back out.

In one implementation, the MyGroupCollection attribute has four parameters; type name, creator name, disposer name, and a legacy name. With respect to the first parameter (i.e., the type name), the compiler will generate accessors for all types that derive from the one specified here within the MyGroup class. The second parameter is the name of the "creator" method. The third parameter is the name of the "disposer" method. There is a fourth parameter is used only to enable backwards compatible "default instance" behavior for forms.

In another implementation, the MyGroupCollection attribute has three parameters; group name, creator name, and disposer name. The first parameter (i.e., the group name), is used to match against the other members. The second parameter is the name of the "creator" method. The third parameter is the name of the "disposer" method.

Class Member(s)

A class member is a class that derives from the type specified in the first parameter to the MyGroupCollection attribute. The member classes are consistent with the code in the generic creator and disposer methods of the group, as instances of the member classes are passed to these methods. For example, in the sample code from above, the disposer method, "DisposeInstance(Of T As Form)(ByRef Instance As T)" invokes Instance.Close( ). The generic constraints are used to enforce this.

Group Generation Process

Figure 6:
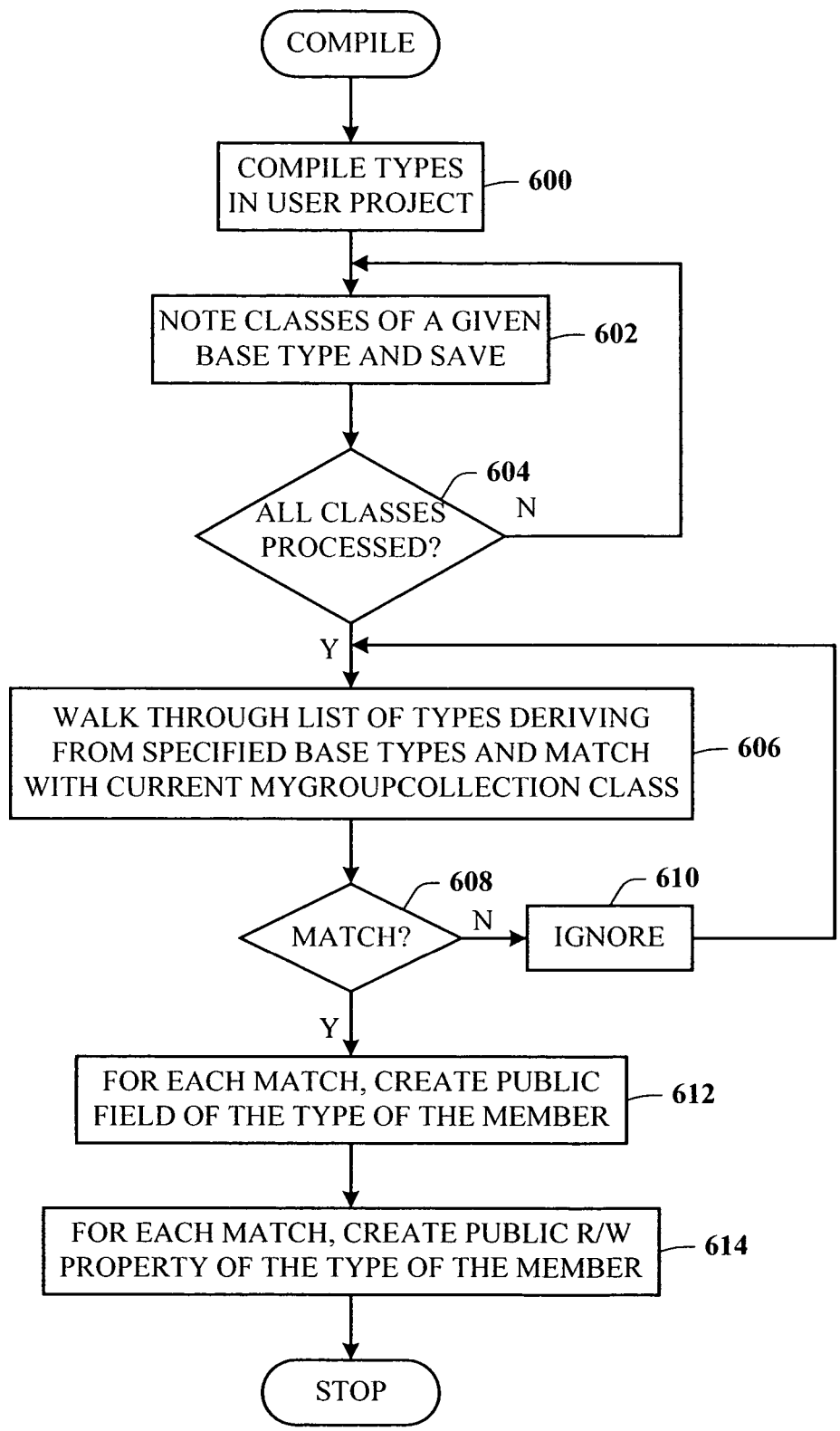
FIG. 6 illustrates a flow chart of a process of compiling in accordance with the present invention.

Referring now to FIG. 6, there is illustrated a flow chart of a process of compiling in accordance with the present invention. At compile time, the compiler performs a number of steps. At 600, the types are compiled in the project. At 602, while the types are compiled in the project, the compiler detects classes that derive from a given base type (MyGroupCollection), and saves the detected classes. At 604, the system checks to determine if all classes have been processed. If NO, flow is back to the input of 602 to continue processing the classes. If YES, flow is from 604 to 606 where the compiler walks through the list of types deriving from the specified base types and match with the current MyGroupCollection class. At 608, the compiler determines if a member does not match a group or if the member is not accessible in the context of the group class. If NO, flow is to 610 where the member is ignored and no error is given. Flow is then back to the input of 606 to continue process the list.

If YES, flow is from 608 to 612 where for each matching MyGroupCollection member, the following is created in the MyGroup class. A Public field is created named "m_<member name>" of the type of the member. The field is marked 'hidden', so it will not be visible to the user, yet it is still accessible for use. If "m_<member name>" conflicts with another member in the MyGroupCollection type, the name is adjusted to be the fully qualified path of the member by replacing periods with underscores. At 614, a Public read/write (R/W) property is also created for each matching MyGroupCollection member and named "<member name>" of the type of the member. The property takes no parameters. The attribute MyGroupProperty is applied to the property with the name of the field created at 612. A getter of the property calls the create method with the field. The getter then returns the value of the field. A setter returns if the property is set to itself. Otherwise, the setter checks to see if the value being assigned is Nothing. If not, the setter throws an exception. Otherwise, the setter calls the dispose member with the field. The setter is generated only if a 'disposer' is provided the exact pattern of the getter and setter methods, as follows.

```
Get( )
    <m_Form1> = <CreateInstance>(Of <Form1>) (<m_Form1>)
    return <m_Form1>
End Get
Set(ByVal <Value> As <Form1>)
    If <Value> Is <m_Form1>
        return
    End If
    If Not <Value> Is Nothing Then
        Throw New ArgumentException( _
            "Property can only be set to Nothing.")
    End If
    <DisposeInstance>(Of <Form1>) (<m_Form1>)
End Set
```

The getter and setter are synthetic methods that are interpreted, and bound later. Potential binding errors to the 'creator' or 'disposer' method are given with no location context. As the templates are fixed code and assumed to be correct, this is unlikely to happen. There is the option to do some pre-binding verification and ignore the problem members, but this is expensive and could hide some design errors. Again, name adjusting is used when multiple members with the same simple name occur.

Code Example

Following is a code example of attributes.

```
'----------------
' Attributes
'----------------
Namespace Name1.Name2
    <AttributeUsage(AttributeTargets.Class, AllowMultiple:=False,
Inherited:=False)> _
<System.ComponentModel.EditorBrowsable(System.ComponentModel.EditorBrowsable
State.Advanced)> _
    Public NotInheritable Class MyGroupCollectionAttribute : Inherits
Attribute
        Public Sub New(ByVal TypeToCollect As String, ByVal
CreateInstanceMethodName As String, _
                ByVal DisposeInstanceMethodName As String, ByVal
DefaultInstanceAlias As String)
            m_NameOfBaseTypeToCollect = TypeToCollect
            m_NameOfCreateMethod = CreateInstanceMethodName
            m_NameOfDisposeMethod = DisposeInstanceMethodName
            m_DefaultInstanceAlias = DefaultInstanceAlias
        End Sub
        Public ReadOnly Property MyGroupName( ) As String
            Get
                Return m_NameOfBaseTypeToCollect
            End Get
        End Property
        Public ReadOnly Property CreateMethod( ) As String
            Get
                Return m_NameOfCreateMethod
            End Get
        End Property
        Public ReadOnly Property DisposeMethod( ) As String
            Get
                Return m_NameOfDisposeMethod
            End Get
        End Property
      Public ReadOnly Property DefaultInstanceAlias( ) As String
            Get
                Return m_DefaultInstanceAlias
            End Get
        End Property
        Private m_NameOfBaseTypeToCollect, m_NameOfCreateMethod,
m_NameOfDisposeMethod, m_DefaultInstanceAlias As String
      End Class
      '' This attribute goes on a generated property in the group
      '<AttributeUsage(AttributeTargets.Property)> Public Class
MyGroupPropertyAttribute
    '      Inherits Attribute
    '      Private _UnderlyingField As String
    '      ' The name of the underlying field
    '      Public ReadOnly Property UnderlyingField( ) As String
    '          Get
    '              Return _UnderlyingField
    '          End Get
    '      End Property
    '      Public Sub New(ByVal UnderlyingField As String)
    '          Me._UnderlyingField = UnderlyingField
    '      End Sub
    'End Class
End Namespace
```

Following is a code example of MyGroupCollection.

```
'---------------
' MyGroupCollection example
'---------------
Imports System
Imports System.Windows.Forms
Imports Microsoft.VisualBasic
<MyGroupCollection("Forms", "CreateInstance", "DisposeInstance")> _
Class Forms
    Private Shared Function CreateInstance(Of T As Form) (ByVal
Instance As T) As T
        If Instance Is Nothing OrElse Instance.IsDisposed Then
            Return New T( )
        Else
            Return Instance
        End If
    End Function
    Private Sub DisposeInstance(Of T As Form) (ByRef Instance As T)
        Instance.Close( )
        Instance = Nothing
    End Sub
    'What generated code would look like
    Public m_Form1 As Form1
    Public Property Form1( ) As Form1
        Get
            ' The name "CreateInstance" below is taken from the
attribute
            m_Form1 = CreateInstance(Of Form1) (m_Form1)
            Return m_Form1
        End Get
        ' The Set is not generated if there is no "DisposeInstance"
argument in the attribute
        Set(ByVal Value As Form1)
            If Value Is m_Form1 Then
                Return
            End If
            If Not Value Is Nothing Then
                Throw New ArgumentException("Property can only
be set to Nothing.")
            End If
            ' The name "DisposeInstance" below is taken from the
attribute
            DisposeInstance(Of Form1) (m_Form1)
        End Set
    End Property
End Class
Class Form1
    Inherits Form
    'etc. etc
End Class
```

Template for My

Following is an architectural specification of the My-template. The template provides the definition of the My object model for the following projects: My.Application, My.Computer, My.Forms, My.User, and My.WebServices.

The template provides the root namespace and root objects for projects such as My.Application and My.Computer. The objects are not statically typed, so they cannot be defined directly in the application runtime. Instead, they are dynamically defined based on the project type. Some of the objects, such as My.Forms and My.Webservices also aggregate user types found within the project such as Forms and strongly typed Datasets. This dynamic definition process is accomplished via an in-memory source code file: the My-template file, combined with support from the compiler.

My-Template Requirements

Availability. This is available for any application compilation, regardless of the system that is calling the compiler. The caller (command-line or project system) enables the My-template by setting the _MYTYPE compilation constant.

Root My Objects. The My-template provides the root My objects—nested under the My namespace. The lifetime and instance context of the root objects and all of their subobjects are managed by the template code. This is handled correctly for all project types, including client applications, web applications, and class libraries.

Dynamic Classes. The shape of the My object model, the Application, Computer and User object changes to match the project type. For example, the Application class in a WinForms project is specific for Winforms and would be different from the Application class in a web project. Some of the classes in the My template are dynamic MyGroup classes: the shape of the class is determined at compile time based on the presence of other user-classes in the project. These includes, but is not limited to, the group classes for Forms, DataSets, and WebServices.

Extensibility. The top-level My objects are extensible via a Partial modifier to support designer code, user events, and advanced project extensibility. On the contrary, the "MyGroup" classes are not expandable. Types can be added to the My namespace by any user code.

Project Specific. The My-template defines the shape of the root My objects in a way that is appropriate for different project types: Windows EXEs, Console EXEs, and DLLs; Windows applications, Web application, windows client DLLs and server DLLs. Projects can also define a custom My shape by selectively including certain root My objects and redefining My.Application and My.Computer.

Operating System Application Model and Startup Object Support. In a WINDOWS Forms project, for example, the My.Application class provides the application's Sub Main, so that My.Application is set as the startup object. The startup or Main form is still selected at design time. (The developer can still select a different class as the Startup Object, but the features of My.Application may not be available at runtime.)

Type Accessibility. The types defined in the My-template are accessible only with the same assembly (Friend). The one exception is for the Code directory of a web application, which in this case, the My types are made public so that all pages on the web can reference the global instances defined in the Code directory.

IntelliSense Visibility. The helper classes dynamically defined in the My-template are marked "advanced". Only the root My objects will show up in the normal completion list. The same visibility is reflected in the Object Browser and in the Class View.

IntelliSense Builders. The My object model MyGroup members (Forms and WebServices) have an "Add New . . . " item in the list.

No Compilation Errors. The My-template compiles without errors regardless of any other project level setting. Therefore, it cannot assume any of the following: specific compiler options such as Option Strict, Option Explicit, Option Compare, or warning levels; project-level imports; assembly references. The My template can depend only on types in DLLs. The compiler reports compilation error out of the My template specially, since this non-user code cannot be edited.

Version Resilience. The types referenced by the My-template are defined in the runtime. Therefore, the version of the template and the version of the runtime are to be kept consistent.

My-Template Design

The My-template file is source code that is injected into a users project in order to define the objects used in the My object model. Using a source code solution allows the shape of the My object model to be configured appropriately for any given project type and allows for certain class types to be automatically defined at compilation time.

The contents of this source file are crafted to avoid compilation errors or warnings. Compilation options and imports are explicitly stated in the file. External type names are fully qualified to avoid ambiguity in the presence of other project-level imports. External types used in the My-template file (including attributes) refer only to types defined in one or more predetermined DLLs.

Source Code Embedded in the Runtime

The My-template file is a fixed source code file that is embedded in the runtime DLL as a resource. This ensures that the runtime and the My-template are always in synch. The core compiler automatically references the DLL and will check for the presence of the My-template resource for all compilations, regardless of the caller or context or _MYTYPE setting. Upon finding the resource, it adds the contents of the resource as a hidden source file buffer to the project. If the version of the DLL that is referenced does not contain this resource, the compiler silently fails and simply ignores the My-template.

Compilation Constants

The contents of the My-template are both enabled and configured via project-level compilation constants. These constants are provided so that specific project types can easily select the right shape of the My class for that project and to allow for custom project scenarios. The compilation constants are the following:

_MYTYPE
_MYPUBLIC
_MYAPPLICATIONTYPE
_MYCOMPUTERTYPE
_MYUSERTYPE
_MYFORMS
_MYWEBSERVICES

These compilation constants are either set by the IDE (Integrated Development Environment) project system or by a /define command-line option.

_MYAPPLICATIONTYPE Compilation Constant

_MYAPPLICATIONTYPE selects the class type for My.Application when _MYTYPE is set to "Custom".

/define:_MYAPPLICATIONTYPE = \"WindowsForms\"
/define:_MYAPPLICATIONTYPE = \"Windows\"

If the value of _MYAPPLICATIONTYPE is not set or unknown, an empty My.Application class is defined that the user is expected to expand using partial classes.

_MYCOMPUTERTYPE Compilation Constant

_MYCOMPUTERTYPE selects the class type for My.Computer when _MYTYPE is set to "Custom".

/define:_MYCOMPUTERTYPE = \"Windows\"
/define:_MYCOMPUTERTYPE = \"Web\"

If the value of _MYCOMPUTERTYPE is not set or unknown, an empty My.Computer class is defined that the user is expected to expand using partial classes.

_MYUSERTYPE Compilation Constant

_MYUSERTYPE selects the class type for My.User when _MYTYPE is set to "Custom".

/define:_MYUSERTYPE = \"Windows\"
/define:_MYUSERTYPE = \"Web\"

If the value of _MYUSERTYPE is not set or unknown, My.User is undefined in the template.

_MYFORMS Compilation Constant

_MYFORMS enables My.Forms if _MYTYPE is set to "Custom".

/define:_MYFORMS = True | False

If the value of _MYFORMS is not set or FALSE, My.Forms is not used in the template.

MYWEBSERVICES Compilation Constant

_MYWEBSERVICES enables My.WebServices if _MYTYPE is set to "Custom".

/define:_MYWEBSERVICES=True|False

If the value of _MYWEBSERVICES is TRUE, My.Webservices is defined in the template, else it is not defined.

MYPUBLIC Compilation Constant

Setting _MYPUBLIC to True causes the types in the My-template to be declared as Public instead of Friend.

/define:_MYPUBLIC=True|False

This is typically not set (or set to False) so that the My types are internal to the assembly. The only case where the My types should be public is in an web server compilation where the My object model from the main code directory should be visible to all of the pages in the web.

My Object Model Implementation

The My object model is logically a tree of objects beginning with the root name "My".

My
  .Application
  .Computer
  .Forms
  .User
  .WebServices

The root name My is a namespace nested under the project's root namespace. The my-template provides a global property accessor for each of the -level members of the My object model. The Resources and Settings classes are not defined in the template, but added externally by adding to the My namespace.

Root Module and Root My Objects

The root objects of the My object model are defined in a root module named MyProject. This module has a public, read-only property for each of the root my objects. The root accessor property manages creation and isolation for each of the My object instances. The MyProject module has private backing fields that hold the My root object instances. A normal module field is Shared by default so that it is global to the AppDomain and visible to all threads. The My objects have particular threading and context requirements so that it is not a simple field.

The particular implementation of the backing field and accessor property is as follows. If the template is compiled into a Windows or Console EXE, the backing field is declared <ThreadStatic>. If the template is compiled into a Library or Module, the backing field uses the ContextValue to hold the instance. The section below describes the particulars of instancing, context and threading for the My objects. The following example shows a sample implementation for My.Application. (It is not a full implementation, since it doesn't employ the ContextValue class.)

```
Module MyProject
    #if _MYAPPLICATIONTYPE <> ""
        Public Property Application As MyApplication
            Get
                If m_Application Is Nothing Then
                    M_Applicaiton = New MyApplication
                End If
                Return m_Application
            End Get
        End Property
        <ThreadStatic> Private m_Application As MyApplication
    #End If
End Module
```

Object Instancing, Context, and Threading

Since the My object model is creating objects on behalf of the user's code, those objects can behave properly under different application contexts and threading scenarios. The basic requirements that are optimized for, are the following: (1) The objects in the My object model are thread-safe. The developer should not have to worry about cross-thread synchronization or supply SyncLocks when accessing the My objects. (2) Dealing with multi-threading in user code, while somewhat advanced, should be consistent for all project types and application types. (3) The My object model should seem to be global from the developers perspective, but at runtime, it actually instances itself appropriately under different application contexts.

This implies that the My objects should always be created per thread, and when running under a webservice, they should be created per HTTP (HyperText Transport Protocol) request. The developer will need to learn how to marshal the object across threads if he wishes to change the state of parts of the My object model from a different thread.

For example, if an object fires an event from a different thread, the developer will see a different instance of My.Forms when handling the event within the other thread. If he wishes to alter the state of a form on his "main" thread, he will need to pass the instance of My.Forms from the main thread to the background thread. He will also need to respond appropriately to synchronize access to that object between both threads.

The implementation of the per-thread or per-context My object model is via the root objects. The sub objects of the root objects are created and held onto by each instance, so they will be in the same context as their parent object. In this way, the root My objects can be created in different contexts and the entire tree will live isolated to that context. The ContextValue class encapsulates the notion of creation and access to the object in different contexts. This class is described below.

ContextValue Generic Class

The ContextValue class manages persistence of an object in the HttpContext or in the CallContext. When running on a web server the My object model can be instanced per HTTP request, so that each page request or web-service request has unique state. For example, ASP (ACTIVE SERVER PAGES) by Microsoft Corporation provides the ability to hang such objects off the HttpContext object. Per-thread data is stored in the CallContext object. When using the ContextValue class, the field should be declared Shared, similarly to when a <ThreadStatic> value is declared. The ContextValue class constructor creates a "slot" for is value to be retrieved from based on the current thread or current HTTP request. The following code shows an example implementation of the ContextValue. This class is implemented in the runtime, and is not in-lined in the template file because it depends on System.Web.dll.

```
Imports System
Imports System.Runtime.Remoting.Messaging
Imports System.Web
Namespace Microsoft.VisualBasic
    Public Class ContextValue Of T
        Private m_ContextKey As String
        Public Sub New( )
            m_ContextKey = Guid.NewGuid.ToString
        End Sub
        Public Property Value( ) As T
            Get
                If System.Web.Hosting.HostingEnvironemnt.IsHosted Then
                    Return
                DirectCast(HttpContext.Current.Items(m_ContextKey),T)
                Else
                    Return
                DirectCast(CallContext.GetData(m_ContextKey),T)
                End If
            End Get
            Set(ByVal Value As T)
                If System.Web.Hosting.HostingEnvironemnt.IsHosted Then
                    HttpContext.Current( ).Items(m_ContextKey) = Value
                Else
                    CallContext.SetData(m_ContextKey, Value)
                End If
            End Set
        End Property
    End Class
End Namespace
```

Dynamic Class Declarations

The My-template provides a class declaration for each of the top-level objects. Using a class declaration in the template file—rather than a fixed base class in the runtime—provides a means for dynamic type definition and for expansion by designer and user code. There are two types of dynamic classes used in the My-template: configurable classes and group classes. The configurable classes change according to project compilation constants. They are configured via the _MYTYPE and constants.

MyApplication

MyComputer

MyUser

The group classes are defined using the <MyGroupCollection> attribute and are dynamically computed by the compiler. The compiler will dynamically add members to these classes at compilation time by finding all of the classes in the project that derive from the type specified in the MyGroupCollection attribute on the collecting class. (The MyGroup feature is not detailed in this document.)

MyForms

MyWebServices

Each of these classes is declared as either Friend or Public, depending on whether the _MYPUBLIC constant is set to True.

MyApplication and MyComputer Classes

MyApplication and MyComputer are dynamically configured based on the _MYTYPE compilation constant. These classes are expandable in user code. (The Application Designer expands MyApplication to set application properties at design-time and to let the user handle events.) The _ MYTYPE compilation constants determine the base classes.

If _MYTYPE is "Custom" then the _MYAPPLICATION-TYPE, _MYCOMPUTERTYPE and _MYUSERTYPE constants determine the base class. Following is an example implementation.

```
#If _MYAPPLICATIONTYPE <> ""
Public Partial NotInheritable Class MyApplication
#If _MYAPPLICATIONTYPE = "WindowsForms"
    Inherits Microsoft.VisualBasic.WindowsFormsApplication
#ElseIf _MYAPPLICATIONTYPE = "Windows"
    Inherits Microsoft.VisualBasic.WindowsApplication
#ElseIf _MYAPPLICATIONTYPE = "Web"
    Inherits Microsoft.VisualBasic.WebApplication
#Elseif _MYAPPLICATIONTYPE = "Server"
    Inherits Microsoft.VisualBasic.ServerApplication
#End If
End Class
#End If
#If _MYCOMPUTERTYPE <> ""
Public partial NotInheritable Class MyComputer
#if _MYCOMPUTERTYPE = "Windows"
    Inherits Microsoft.VisualBasic.WindowsComputer
#ElseIf _MYCOMPUTERTYPE = "Server"
    Inherits Microsoft.VisualBasic.ServerComputer
#End If
End Class
#End If
```

Sub Main in MyApplication

For Windows Forms applications, the MyApplication class needs to be set as the Startup Object and must contain a Shared Sub Main. However, the My-template does not contain the Shared Sub Main. Instead, the user's code Expands MyApplication and adds Shared Sub Main there. The My-template supplies this by default for the Windows-Forms case.

```
Namespace My
    Class MyApplication
    #if _MYAPPLICATION = "WindowsForms"
        <STAThread( )> Shared Sub Main(Args As String( ))
            My.Application.SubMain(Args)
        End Sub
    #End If
    End Class
End Sub
```

MyForms and MyWebServices Classes

The MyForms and MyWebServices are all group classes. This is not an exhaustive list, since others can be added according to the application being developed. They have the <MyGroupCollection> attribute so that the compiler will dynamically compute the members of the class based on the presence of other user classes in the project. The MyGroupCollection attribute can take a String parameter for matching user classes of that type. The compiler simply ignores the attribute if matching classes are found. Since the My template cannot control the set of project references, the My-template always uses the MyGroupAttribute(String) constructor. MyGroupCollection classes cannot inherit from a base class (other than object) and cannot define any members. They are therefore declared NotInheritable and in one implementation, can be declared NotExpandable.

```
#If _MYFORMS
<MyGroup( ??? )> _
Public NotInheritable NotExpandable Class MyForms
End Class
#End If
```

Enabling the My Object Model in Standard Projects

Compilation constants are already set by the CompilationConstants property. This is a comma-separated list of values stored in a single string.

| Project Template/Type | Constants |
| --- | --- |
| Windows Application | _MYTYPE = "WindowsForms" |
| Console Application | _MYTYPE = "Windows" |
| Windows Service | _MYTYPE = "Web" |
| Windows Class Library | _MYTYPE = "Windows" |
| Windows Control Library | _MYTYPE = "Windows" |
| Server Class Library [new] | _MYTYPE = "Server" |
| Web Control Library | _MYTYPE = "Web" |
| Empty Project | _MYTYPE = "Windows" |
| Web Project (Venus) | _MYTYPE = "Web"* |

*Set by web server build system.

Compilation Constants

The My-template is controlled by setting project-level compilation constants on the command-line. When compiling the primary code directory, the My objects are made visible to the rest of the web, so that web pages will see the same object model and instances as the primary code directory.

```
/define:_MYTYPE =\"Web\"
/define:_MYPUBLIC=True
```

When compiling nested code directories that are language, the My objects are visible only to that directory, so _MYPUBLIC is False.

```
/define:_MYTYPE=\"Web\"
/define:_MYPUBLIC=False
```

When compiling objects other than code directories, such as global.asax and .aspx pages, the My objects are either turned on depending on whether the primary code directory was the language. If the primary code directory was the language, then pages and global.asax have My turned off. These objects access the public My objects exposed from the primary code directory.

```
/define:_MYTYPE=
```

If the primary code directory does not exist or was not the language, then pages and global.asax have My enabled.

These objects define their own local My objects.

```
/define:_MYTYPE=\"Web\"
/define:_MYPUBLIC=False
```

My.Resources

Normally, when compiling resources, RESGEN is called and sets the namespace to "Resources". When the main code directory is compiled for the language, all resources are compiled into the "My.Resources" namespace instead.

Enabling the My Object Model in Other Environments

Other environments that use the standard desktop version of a DLL are free to set the _MYTYPE and other compilation constants as necessary to provide the best user and programmability experience for their project types. The can also take advantage of extensibility and customization features as listed below. "Smart Device" projects use a different version of the DLL. This implies that there might be a subset of the My-types available in the runtime.

Extensibility and Customization

The typical user extends the My object model by adding members to the Application object and handling Application events. Advanced customization is available via expanding Application, Computer, and User, or by replacing them with a custom version. Additionally, new root objects can be added by adding them to the My namespace in user code.

Expanding the Application Object

The developer generally interacts with the root Application class via the project's Application Designer. The designer allows the developer to handle events on the Application class, as well as to add other members. This example shows handling the Startup event.

```
Namespace My
    Class MyApplication
        Private Sub MyApplication_Startup(Sender As Object, e as CancelEventArgs) _
            Handles MyBase.Startup
            If Not Login( ) Then
                e.Cancel = True
            Else
                Me.MainForm = New CustomMainForm
            End If
        End Sub
    End Class
End Namespace
```

Expanding Top-level Objects

More advanced users may learn to expand other features of the My object model by adding project-specific members as appropriate. For example, some customers have asked how to add a bar code reader to the Computer class. Since all of the root objects are expandable, this is easily done.

```
Namespace My
    Public Class BarCodeReader
        Public Sub Scan( )
            ...
        End Sub
    End Class
    Class MyComputer
        Private m_BarCodeReader As New BarCodeReader( )
        Public ReadOnly Property BarCodeReader( ) As BarCodeReader
            Get
                Return m_BarCodeReader
            End Get
        End Property
    End Class
End Namespace
```

The user can now access the bar code reader from the root Computer object.

My.Computer.BarCodeReader.Scan( )

Adding New Root Objects

In the same way as other root objects, the My namespace may also be expanded with user or project defined members. For example, what if Big Bank wants to add the BankingSystem object under My. They would first produce BigBank.Banking.dll that defines the BankingSystem class. They would then produce a source file that expands the My class. This "Expansion File" is then added to any Client or Web project as a normal source file. Following is a sample Expansion File.

```
' MyBigBank.vb
Imports BigBank.Banking ' Requires a project reference to BigBank.Banking.dll
Namespace My
#If _MYPUBLIC Then
    Public Module MyBankingSystem
#Else
    Friend Module MyBankingsystem
#End If
        <ThreadStatic> Private m_BankingSystem As BankingSystem
        Public ReadOnly Property BankingSystem( ) As BankingSystem
            Get
                If m_BankingSystem Is Nothing Then
                    m_BankingSystem = New BankingSystem( )
                End If
                Return m_BankingSystem
            End Get
        End Property
    End Module
End Namespace
```

The developer can now access the BankingSystem object from My.

```
My.BankingSystem.TransferFunds(...)
```

Custom My.Application, My.Computer and My.User

The My object model supplies default application models for certain application types. Other application models might necessarily need different semantics for the Application, Computer and User objects. In some cases, simply expanding the language-supplied classes will not do. Instead, the user project defines its own top-level Application and User classes. A customization declaration is created and added to the Client or Web project just like any other source file. These classes can follow the same declaration pattern as the other classes defined in the My-template. To enable this, the project system or language command-line sets the _MYTYPE compilation constant to "Custom". In the following example, Big Bank wants to use the standard My.Computer and My.User, but wants to replace My.Application with their own base class implementation.

```
@bigbank.resp
/reference:BigBank.dll
/define:_MYTYPE=\"Custom\"
/define:_MYCOMPUTER=\"Windows\"
/define:_MYUSER=\"Windows\"
/define:_MYFORMS=True
/define:_MYWEBSERVICES=True
MyBigBank.vb
' MyBigBank.vb
Imports BigBank.MyCustomizations
Namespace My
    Public Module MyBankingSystem
        <ThreadStatic> Private m_Application As MyApplication
        Public ReadOnly Property Application( ) As MyApplication
            Get
                If m_Application Is Nothing Then
                    m_Application = New MyApplication( )
                End If
                Return m_Application
            End Get
        End Property
    End Module
    Public Class MyApplication
        Inherits BigBankCustomApplication
    End Class
End Namespace
```

Application Designer Integration

The Application Designer relies on the extensibility model to add user-customization to My.Application, My.Settings and My.Resources. The Application Designer should be aware of the project's _MYTYPE setting, since certain application properties only apply if _MYTYPE="WinForms". If _MYTYPE is not set to "WinForms", the design disables irrelevant features.

Application Designer and My.Application

The My-template defines the MyApplication class. The Application Designer handles two files with expanded class definitions for MyApplication, one for the designer code and one for user code. The designer file contains the constructor and initializes properties set in the designer. It also has private WithEvents declarations for sub-objects that the user wishes to handle events. The user file contains event handlers and, optionally, user-defined fields and members.

Designer File: MyApplication.Designer.vb

```
                              End Namespace
```

User File: MyApplication.User.vb

```
Namespace My
    Expands Class MyApplication
        ' Declare User-defined fields/members
        ' These are available off of My.Application
        Public ReadOnly Property MyProperty() As String
            Get
                Return "MyPropertyValue"
            End Get
        End Property
        ' Handle Application Events
        Private Sub MyApplication_Startup(Sender As Object, e As CancelEventArgs)
            Handles MyBase.Startup
            ' User startup code here...
        End Sub
        ' Handle DeploymentManager Events
        Private Sub MyApplication_UpdateAvailable(Sender As Object, e As EventArgs)
            Handles Me.DeploymentManagerEvents
            ' User event handler code here...
        End Sub
    End Class
```

Application Designer and My.Settings

The My-template does not define My.Settings. The project system is responsible for adding an appropriate settings class and adding a root accessor to the My namespace. See the technique described herein under "Adding New Root Objects".

Application Designer and My.Resources

The My-template does not define My.Resources. Generated resources are "static" classes. The code generator takes a "namespace" parameter to generate the class in. For integration with the My object model, the resource namespace is "My.Resources". This allows access to resource members as follows.

My.Resources.ResourceFileName.ItemName.

The one exception is the main project resources file. This one also is generated into the "My.Resources" namespace, but is not generated as a "static" class. Instead, it is generated as a standard module so that its members can be accessed directly from the My.Resources namespace.

My.Resources.ItemName.

Filtering My-template Types

The My-template file can use any of the attributes defined in System.ComponentModel (in system.dll). The <EditorBrowsable> attribute is applied as necessary so that the implementation classes do not show up, but only the root members.

My.Computer is one of the top-level groupings under the example My namespace. My.Computer provides access to instances of the most commonly used objects of the development framework that relate to items in the computer running the application. Although not all of the following are shown in FIG. 3, the Computer class 306 can include event logs, performance counters, registry, printer, audio, clipboard, file system, etc., which are examples of such common classes.

Following are sample User Interaction Scripts that can be employed.

Dev wants to know what the resolution setting of the screen.

```
If My.Computer.Screen.Width > 1200 Then
    PictureBox1.Image = My.Resources.Images.HighResLogo
Else
    PictureBox1.Image = My.Resources.Images.LowResLogo
End If
```

Dev wants to know if the keyboard keys CapsLock, NumLock, and ScrollLock are turned on.

```
Private Sub txtPassword_GotFocus(...) Handles txtPassword.GotFocus
    If My.Computer.Keyboard.CapsLock Then
        MsgBox("CapsLock is On")
    End If
End Sub
```

Dev wants to find out how many printers are accessible from the computer.

```
MsgBox("Number of Printers:" & My.Computer.Printers.Count)
```

Dev wants to select one of the accessible printers and set it as a default printer.

```
Private Sub btnSelectPrn_Click(...) Handles btnSelectPrn.Click
    My.Computer.Printers(ListBox1.SelectedItem) .SetAsDefault
End Sub
```

Dev wants to print a document to the default printer.

```
Private Sub PrintTable( )
    With My.Computer.Printer
        .OutputType = OutputTypes.Printer
        .PrintLine("Invoice")
        .PrintHorizontalLine( )
        .Printer.EndDoc
    End With
End Sub
```

Dev wants to play a sound on the computer.

```
Private Sub App_Start(...) Handles Application.Start
    My.Computer.Audio.PlaySound(My.Resources.Sounds.AppStart)
End Sub
```

Dev wants to read/write from/to the clipboard.

```
Private Sub Paste( )
    txtNames = txtNames & vbcrlf & My.Computer.Clipboard.GetText( )
End Sub
```

Dev wants to know what operating system (OS) is running on the computer.

```
Private Sub CheckOS( )
    If My.Computer.OperatingSystem <> "WinXP" Then
        MsgBox("Sorry, themes are only supported in Windows XP")
    End If
End Sub
```

Dev wants to read/write from/to the registry.

```
Private Sub UpdateMRUItems( )
    Dim RegValue as RegistryValue
    Dim MRU_KEY As String =
"Software\Microsoft\ApplicationName\MRU_Items
    For Each RegValue in
My.Computer.Registry.CurrentUser.SubKey(MRU_KEY).Values
        lbMRU.Items.Add(RegValue.Value)
    Next
End Sub
```

Other scripts can include accessing performance counters and read/write from/to a serial port, for example.

Computer Object Details

Following is an overview of one implementation of the Computer Object Member.

| Member | Description |
| --- | --- |
| Clock | Returns the clock object |
| FileSystem | Provides access to the Drives collection as well as simple methods to read/write and manipulate files |
| Keyboard | Provides access to the keyboard features |
| Mail | Provides access to sending email |
| Mouse | Provides access to the mouse features |
| Name | Returns the name of the computer |
| Network | Provides access to Network properties and events |
| OperatingSystem | Provides details (type/version) of OS |
| Registry | Returns an instance of the registry object |
| Screen | Returns the primary screen object |
| Audio | Provides access to the audio features on the computer |
| Clipboard | Provides access to clipboard |
| DirectoryServices | Allows browsing of active directory |
| PerformanceCounters | Returns a collection of performance counters |
| Ports | Returns collection of port objects for each port on the computer |
| Printer | Returns an instance of the default printer object |
| Printers | Returns a collection of printers attached to computer |
| Processes | Returns a collection of all processes running on the computer |

-continued

| | |
|---|---|
| Services | Returns a collection of all services running on the computer |
| Cameras | Enumerates the cameras and scanners attached to the computer |
| Devices | Enumerates devices attached to the computer |
| GameControllers | Enumerates game controllers and joysticks attached to the computer |
| ManagementInstrumentation | Allows listing to managed events |
| Modems | Enumerates modems attached to computer |
| Power | Returns an instance of the power object |

Computer Properties - Audio

| | |
|---|---|
| Description | Provides access to the audio features on the computer, like playing sounds. |
| Type | Sound |
| Access Type | ReadOnly |
| Dependency | Framework Sound Class. |

Computer Properties - Clock

| | |
|---|---|
| Description | Provides access to local and GMT time |
| Type | Clock (need) |
| Access Type | ReadOnly |

Computer Properties - EventLogs

| | |
|---|---|
| Description | Accesses the event logs on the computer. |
| Type | EventLogs |
| Access Type | ReadOnly |
| Notes | ApplicationLog, SecurityLog, SystemLog |

Computer Properties - FileSystem

| | |
|---|---|
| Description | Provides access to the drives collection for that system as well as methods to manipulate files and directories. Also provides methods to read and write to files. |
| Type | FileSystem |
| Access Type | ReadOnly |

Computer Properties - Keyboard

| | |
|---|---|
| Description | Provides access to the keyboard features on the computer. |
| Type | Keyboard (need) |
| Access Type | ReadOnly |

Computer Properties - Mail

| | |
|---|---|
| Description | Provides access to sending mail |
| Type | Mail (need) |
| Access Type | ReadOnly |

Computer Properties - Mouse

| | |
|---|---|
| Description | Provides access to the mouse features on the computer. |
| Type | Mouse (need) |
| Access Type | ReadOnly |

Computer Properties - Name

| | |
|---|---|
| Description | Returns the name of the computer. |
| Type | String |
| Access Type | ReadOnly |
| Notes | Use System.Environment.MachineName. |

Computer Properties - Network

| | |
|---|---|
| Description | Provides access to Network Connectivity types and events |
| Type | Network |
| Access Type | ReadOnly |

Computer Properties - OperatingSystem

| | |
|---|---|
| Description | Provides access to version and platform of operating system |
| Type | OperatingSystem |
| Access Type | ReadOnly |

Computer Properties - Registry

| | |
|---|---|
| Description | Returns an instance of Registry object for this computer |
| Type | Registry |
| Access Type | ReadOnly |

-continued

| Computer Properties - Screen | |
|---|---|
| Description | Returns the primary display object |
| Type | System.Windows.Forms.Screen |
| Access Type | ReadOnly |
| Computer Properties - Clipboard | |
| Description | Provides read and write access to the clipboard. |
| Type | System.Windows.Forms.Clipboard |
| Access Type | ReadOnly |
| Computer Properties - Ports | |
| Description | Returns collection of port objects for each port on the computer |
| Type | PortCollection (need) |
| Access Type | ReadOnly |
| Computer Properties - PerformanceCounters | |
| Description | Provides access to adding/removing/accessing perf counters |
| Access Type | ReadOnly |

Ports Object Details

| Ports Properties - SerialPorts( ) | |
|---|---|
| Description | Enumerates all serial ports available |
| Type | SerialPorts |
| Access Type | ReadOnly |

SerialPorts Object Details

| SerialPorts Properties - COM1( ) | |
|---|---|
| Description | Provides access to sending/receiving data via COM1 serial port |
| Type | SerialPort |
| Access Type | ReadOnly |

SerialPort Object Details

| SerialPort Methods - Send | |
|---|---|
| Signature | Send(Data As String) |
| Description | Sends data via serial port |
| Parameters | Data: Data to send |

Computer Object Details

| Computer Properties - DirectoryServices | |
|---|---|
| Description | Allows browsing of Active Directory. |
| Type | DirectoryServices (need) |
| Access Type | ReadOnly |
| Computer Properties - PerformanceCounters | |
| Description | Returns a collection of PerfCounters |
| Type | PerformanceCounterCollection (need) |
| Access Type | ReadOnly |

-continued

| Computer Properties - Printer | |
|---|---|
| Description | Return an instance of the default printer object |
| Type | Printer (need) |
| Access Type | ReadOnly |
| Computer Properties - Printers | |
| Description | Returns a collection of printers attached to computer |
| Type | PrinterCollection (need) |
| Access Type | ReadOnly |
| Computer Properties - Power | |
| Description | Returns an instance of the power object |
| Type | Power (need) |
| Access Type | ReadOnly |
| Computer Properties - Processes | |
| Description | Returns a collection of all processes running on computer |
| Type | ProcessCollection (need) |
| Access Type | ReadOnly |
| Computer Properties - Services | |
| Description | Returns a collection of all services running on computer |
| Type | ServiceCollection (need) |
| Access Type | ReadOnly |

VolumeControl Object Details

| VolumeControl Properties - CDVolume | |
|---|---|
| Description | Provides access to modify volume of CD audio |
| Type | Volume |
| Access Type | ReadOnly |
| VolumeControl Properties - CDBalance | |
| Description | Provides access to modify speaker balance for CD audio |
| Type | VolumeBalance |
| Access Type | ReadOnly |

-continued

| VolumeControl Properties - LineInVolume | |
|---|---|
| Description | Provides access to modify volume of LineIn audio |
| Type | Volume |
| Access Type | ReadOnly |

| VolumeControl Properties - LineInBalance | |
|---|---|
| Description | Provides access to modify speaker balance for LineIn audio |
| Type | VolumeBalance |
| Access Type | ReadOnly |

| VolumeControl Properties - MasterVolume | |
|---|---|
| Description | Provides access to modify volume of all audio |
| Type | Volume |
| Access Type | ReadOnly |

| VolumeControl Properties - MasterBalance | |
|---|---|
| Description | Provides access to modify speaker balance for all audio |
| Type | VolumeBalance |
| Access Type | ReadOnly |

| VolumeControl Properties - WavVolume | |
|---|---|
| Description | Provides access to modify volume of WAV file audio |
| Type | Volume |
| Access Type | ReadOnly |

| VolumeControl Properties - WavBalance | |
|---|---|
| Description | Provides access to modify speaker balance for WAV file audio |
| Type | VolumeBalance |
| Access Type | ReadOnly |

Volume Object Details

| Volume Properties - IsMax | |
|---|---|
| Description | Checks if volume is at its Max position |
| Type | Boolean |
| Access Type | ReadOnly |

| Volume Properties - IsMin | |
|---|---|
| Description | Checks if volume is at its Min position |
| Type | Boolean |
| Access Type | ReadOnly |

Volume Methods

| IncreaseVolume | |
|---|---|
| Signature | IncreaseVolume( ) |
| Description | Increase volume by one notch |
| Parameters | None |
| Return Type | None |

| DecreaseVolume | |
|---|---|
| Signature | DecreaseVolume( ) |
| Description | Decrease volume by one notch |
| Parameters | None |
| Return Type | None |

VolumeBalance Object Details

| VolumeBalance Properties - IsMaxLeft | |
|---|---|
| Description | Checks if volume balance is at its maximum left position |
| Type | Boolean |
| Access Type | ReadOnly |

| VolumeBalance Properties - IsMaxRight | |
|---|---|
| Description | Checks if volume balance is at its maximum right position |
| Type | Boolean |
| Access Type | ReadOnly |

| VolumeBalance Properties - IsBalanced | |
|---|---|
| Description | Checks if volume balance is at its balanced (middle) position |
| Type | Boolean |
| Access Type | ReadOnly |

VolumeBalance Methods

| IncreaseLeft | |
|---|---|
| Signature | IncreaseLeft( ) |
| Description | Move volume balance to left by one notch |
| Parameters | None |
| Return Type | None |

| IncreaseRight | |
|---|---|
| Signature | IncreaseRight( ) |
| Description | Move volume balance to right by one notch |
| Parameters | None |
| Return Type | None |

CD Object Details

| CD Properties - IsCDInDrive | |
|---|---|
| Description | Checks if a CD is in the CDRom Drive |
| Type | Boolean |
| Access Type | ReadOnly |

CD Methods

| CloseTray | |
|---|---|
| Signature | CloseTray( ) |
| Description | Closes the CDRom Tray |
| Parameters | None |
| Return Type | None |

| OpenTray | |
|---|---|
| Signature | OpenTray( ) |
| Description | Opens the CDRom Tray |
| Parameters | None |
| Return Type | None |

| Play | |
|---|---|
| Signature | Play( ) |
| Description | Plays the CD Music |
| Parameters | None |
| Return Type | None |

| Cameras | |
|---|---|
| Description | Enumerates the cameras and scanners attached to the computer. |
| Type | CameraCollection (need) |
| Access Type | ReadOnly |

-continued

GameControllers

| | |
|---|---|
| Description | Enumerates the game controllers and joysticks attached to the computer. |
| Type | GameControllerCollection (need) |
| Access Type | ReadOnly |

ManagementInstrumentation

| | |
|---|---|
| Description | Allows listening to management events. |
| Type | ManagementInstrumentation (need) |
| Access Type | ReadOnly |

Modems

| | |
|---|---|
| Description | Enumerates the modems on the computer. |
| Type | ModemCollection (need) |
| Access Type | ReadOnly |

The following table lists items implemented and summarizes their design for security purposes.

| Member | Short design Summary |
|---|---|
| Name | Returns a property of type string from a Frameworks' class |
| Keyboard | A new class that provides the following properties: CapsLock NumLock ScrollLock ShiftKeyDown AltKeyDown CtrlKeyDown |
| Mail | Uses SMTP Service to send out emails - the concern is that we are simplifying sending email and this could simplify spamming. |
| Mouse | Read-only properties to find out info about the mouse attached to the pc - is it there, does it have a wheel, how many buttons, etc. Uses FX (return framework) object |
| Network | Check if connected, what your IP addresses are, and provides a PING method. |
| OperatingSystem | Returns an instance FX (BCL) object |
| Screen | Returns an instance of System.Windows.Form.Screen object |
| TickCount | Returns a value from an FX class |
| Clock | Provides two properties that both get values from FX classes |
| EventLogs | A new class with following methods and properties Application - returns an instance of EventLog class System - returns an instance of EventLog class Item(Log As String) - returns an instance of EventLog class LogExists(Log As String) - Wrapper of FX method - Depends on FX's security CreateLog(Log As String) - wrapper of FX method - depends on FX's security DeleteLog(Log As String) - Wrapper of FX method - depends on FX's security |
| EventLog (Not available directly under My.Computer, but is used by My.Computer.EventLogs) | A new class with following methods ClearAll - Wrapper of FX method - depends on FX's security ReadEntries - Wrapper of FX method - depends on FX's security WriteEntries - Wrapper of FX method - depends on FX's security |
| FileSystem | A new class Drives returns a collection of Directory objects - see directory object A number of file manipulation methods that use FX methods in their implementation, except the following: GetRelativePath - Uses a method to resolve "8/3" directory names - could return path of a restricted directory CopyDirectory - own copy method MoveDirectory - own move method |
| SpecialFolders | |
| Registry | A new class that wraps the FX classes |
| RegistryKey (Not available directly under My.Computer, but is used by My.Computer.Registry) | A new class that wraps the FX classes |
| RegistryValue (Not available directly under My.Computer, but is used by My.Computer.Registry) | A new class that wraps the FX classes |
| RegistryKeyCollection (Not available directly under My.Computer, but is used by My.Computer.Registry) | A new collection class built using FX classes |

-continued

| | |
|---|---|
| RegistryValueCollection (Not available directly under My.Computer, but is used by My.Computer.Registry) | A new collection class built using FX classes |

Figure 7:
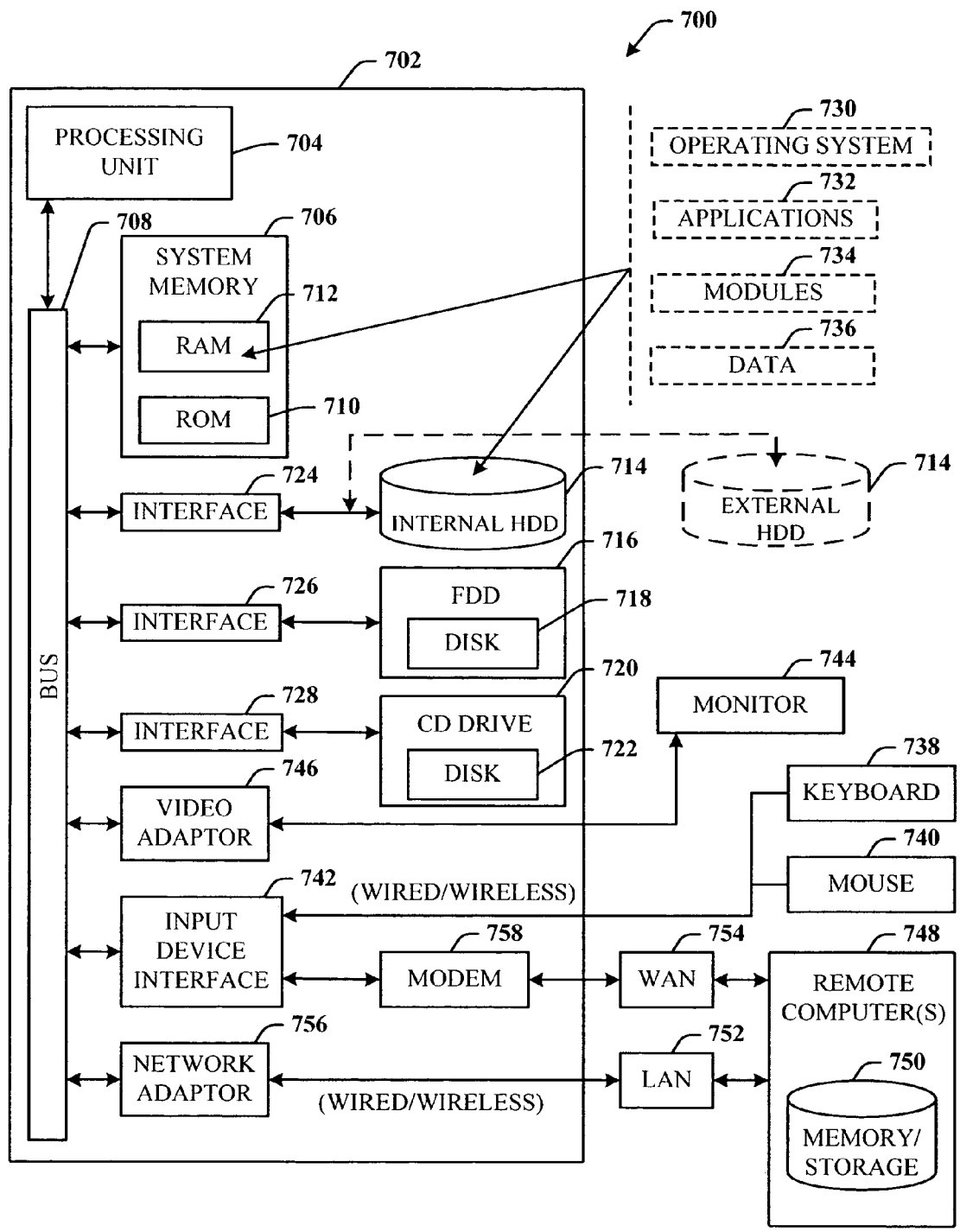
FIG. 7 illustrates a block diagram of a computer operable to execute the disclosed architecture.

Referring now to FIG. 7, there is illustrated a block diagram of a computer operable to execute the disclosed architecture. In order to provide additional context for various aspects of the present invention, FIG. 7 and the following discussion are intended to provide a brief, general description of a suitable computing environment 700 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices.

The illustrated aspects of the invention may also be practiced in distributed computing environments where certain tasks are performed by remote processing devices that are linked through a communications network. In a distributed computing environment, program modules may be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 7, there is illustrated an exemplary environment 700 for implementing various aspects of the invention that includes a computer 702, the computer 702 including a processing unit 704, a system memory 706 and a system bus 708. The system bus 708 couples system components including, but not limited to, the system memory 706 to the processing unit 704. The processing unit 704 may be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 712, including an operating system 730, one or more application programs 732, other program modules 734 and program data 736. All or portions of the operating system, applications, modules, and/or data can also be cached in the RAM 712.

It is appreciated that the present invention can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but may be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers etc.

The computer 702 may operate in a networked environment using logical connections via wired and/or wireless communications to one or more remote computers, such as a remote computer(s) 748. The remote computer(s) 748 may be a workstation, a server computer, a router, a personal computer, portable computer, microprocessor-based entertainment appliance, a peer device or other common network node, and typically includes many or all of the elements described relative to the computer 702, although, for purposes of brevity, only a memory storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices, and companies, and facilitate enterprise-wide computer networks, such as intranets, all of which may connect to a global communication network, e.g., the Internet.

When used in a LAN networking environment, the computer 702 is connected to the local network 752 through a wired and/or wireless communication network interface or adapter 756. The adaptor 756 may facilitate wired or wireless communication to the LAN 752, which may also include a wireless access point disposed thereon for communicating with the wireless adaptor 756. When used in a WAN networking environment, the computer 702 can include a modem 758, or is connected to a communications server on the LAN, or has other means for establishing communications over the WAN 754, such as by way of the Internet. The modem 758, which may be internal or external and a wired or wireless device, is connected to the system bus 708 via the serial port interface 742. In a networked environment, program modules depicted relative to the computer 702, or portions thereof, may be stored in the remote memory/storage device 750. It will be appreciated that the network connections shown are exemplary and other means of establishing a communications link between the computers may be used.

The computer 702 is operable to communicate with any wireless devices or entities operably disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

Figure 8:
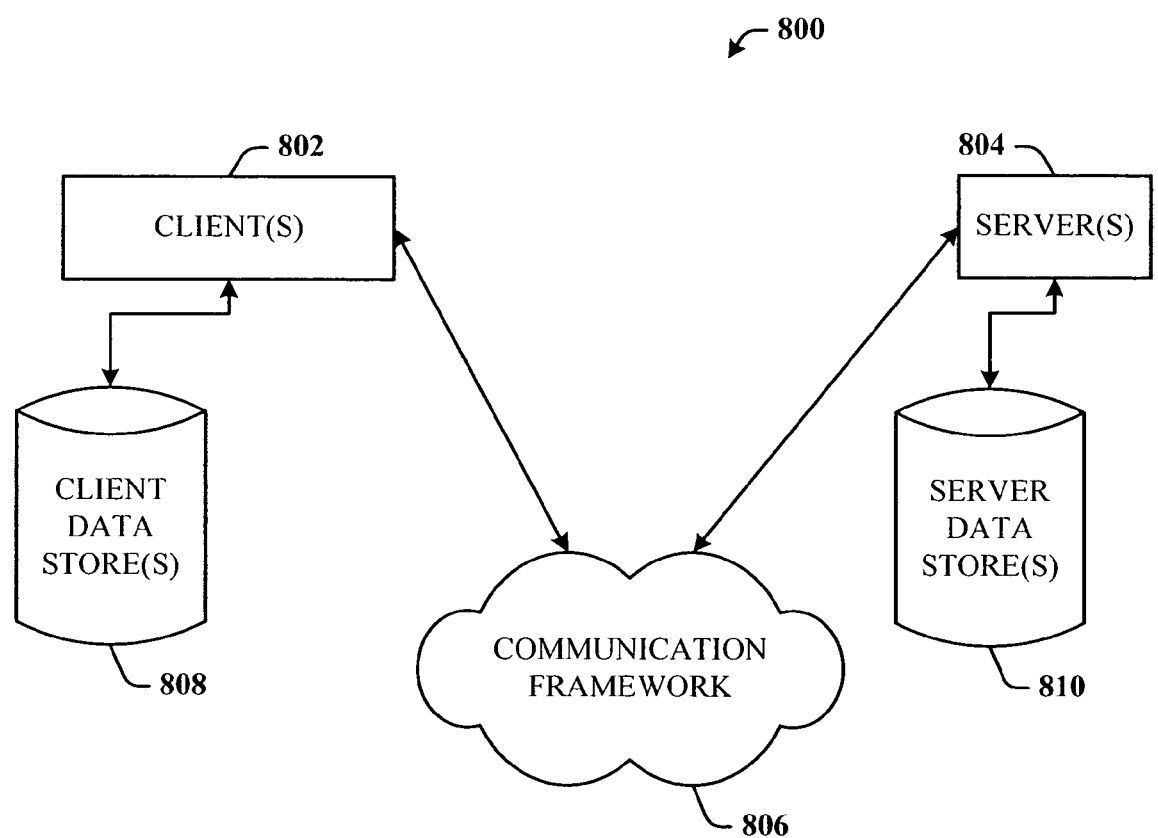
FIG. 8 illustrates a schematic block diagram of an exemplary computing environment in accordance with the present invention.

Referring now to FIG. 8, there is illustrated a schematic block diagram of an exemplary computing environment 800 in accordance with the present invention. The system 800 includes one or more client(s) 802. The client(s) 802 can be hardware and/or software (e.g., threads, processes, computing devices). The client(s) 802 can house cookie(s) and/or associated contextual information by employing the present invention, for example. The system 800 also includes one or more server(s) 804. The server(s) 804 can also be hardware and/or software (e.g., threads, processes, computing devices). The servers 804 can house threads to perform transformations by employing the present invention, for example. One possible communication between a client 802 and a server 804 may be in the form of a data packet adapted to be transmitted between two or more computer processes. The data packet may include a cookie and/or associated contextual information, for example. The system 800 includes a communication framework 806 (e.g., a global communication network such as the Internet) that can be employed to facilitate communications between the client(s) 802 and the server(s) 804.

Communications may be facilitated via a wired (including optical fiber) and/or wireless technology. The client(s) 802 are operably connected to one or more client data store(s) 808 that can be employed to store information local to the client(s) 802 (e.g., cookie(s) and/or associated contextual information). Similarly, the server(s) 804 are operably connected to one or more server data store(s) 810 that can be employed to store information local to the servers 804.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system stored in computer memory that facilitates building an application using a development framework, the system comprising the following computer executable components:
    an exposer component that exposes a set of classes, which set includes at least one of a framework class of the framework and a project class of a project, which at least one of the framework class and the project class is used to develop the application; and
    the exposer component further comprising an identifier component that identifies from source code one or more members of at least a group class and a compiler that compiles the one or more members into the at least one group class thus creating a namespace that provides access to one or more classes that are used more frequently than other classes.

2. The system of claim 1, the set of classes includes at least one of a class related to a computing device on which the application will be run, a class that provides information about the application, an object that provides information about a user that runs the application, and a class that is commonly used in the project.

3. The system of claim 2, the class that is commonly used is related to one of a form, a web service, a resource, and a setting.

4. The system of claim 1 facilitates creation of a single entry point to common classes for building the application.

5. The system of claim 1, the exposer component exposes a class of a plurality of namespaces of the framework.

6. The system of claim 1, the exposer component facilitates creation of a namespace that provides hierarchical access to instances of classes that are commonly used to develop the application.

7. The system of claim 6, the namespace includes a default set of the classes.

8. The system of claim 1 is extensible such that a new class can be exposed that is provided in accordance with at least one of an expansion of the framework and an improvement to the framework.

9. A computer employing the system of claim 1.

10. The system of claim 1, the set of classes is a top-level set that includes one or more classes related to the application, a computer running the application, a user running the application, a form of the project, a web service referenced in the project, a resource of the project, and a setting of the application.

11. A system stored in computer memory that facilitates building an application within a development framework, comprising the following computer executable components:
    a compiler that compiles code; and
    an identification component that receives search information related to class information of at least a class to be identified, which identification component signals the compiler to search the code based on the search information and tag the class information to dynamically generate the class comprising one or more members identified from source code hence providing hierarchical access to instances of classes that are used more freciuently than other classes.

12. The system of claim 11, the compiler tags the class information during compilation of the code.

13. The system of claim 11, the compiler provides user access to the tagged information.

14. The system of claim 11, the class information is tagged utilizing a compiler attribute.

15. The system of claim 11, the tagged class information is pulled out and compiled separately with respect to compiling the code.

16. The system of claim 11, the class includes strong types and bounded access that points only to an object of the class.

17. The system of claim 11, the system dynamically generates types in a namespace that reference internal resources.

18. A system that facilitates building an application within a development framework stored in computer memory, the system comprising the following computer executable components:
    a compiler that compiles code, which compiler receives search information associated with class information from an identification component, searches the code based on the search information, tags the class information and dynamically generates a class that refers to an internal resource by pulling out the tagged class information and compiling the tagged class information.

19. The system of claim 18, the compiler compiles the tagged class information to generate a class that facilitates user access to an internal resource.

20. A method of aggregating functionality in support of building an application, comprising:
    identifying a class of objects to be returned from source code;
    searching the source code for one or more of the objects;
    collecting the one or more objects that are found;
    generating a property for each of the one or more objects that are found;
    accessing the one or more objects that have the associated property; and
    compiling the one or more objects that are associated with a name space, into the class.

21. The method of claim 20, further comprising associating the class with an indicator that is unique to the class.

22. The method of claim 20, the one or more objects that are found, are collected according to an attribute.

23. A computer-readable storage medium having computer-executable instructions for performing a method of building an application, the method comprising:
    providing a programming language compatible with an application environment, the language used for developing the application;
    identifying objects of the application environment;
    searching source code of the application environment for one or more of the objects;
    generating a property for each of the one or more objects that are found;
    accessing the one or more objects that have the associated property; and compiling the one or more objects into a class associated with a namespace.

24. A system that facilitates building of an application, comprising:
    means for identifying an object of an application development environment;
    means for searching source code of the environment for one or more of the objects;
    means for generating a property for each of the one or more objects that are found;
    means for returning the one or more objects that have the associated property;
    means for compiling the one or more objects into a class; and
    means for associating the class with a namespace.

25. The system of claim 24, the means for compiling fetches source files from a runtime library.

26. The system of claim 24, further comprising means for injecting source code into a user project based on a library that was referenced.

27. The system of claim 24, the one or more objects are top level objects that have a class declaration associated therewith.

28. The system of claim 24, the property is part of source code that is embedded in a runtime dynamic linked library as a resource.

29. The system of claim 28, the means for compiling automatically references the library, and checks for the presence of the resource for all compilations.

30. The system of claim 28, the means for compiling adds contents of the resource as a hidden source file buffer to a project defined within the environment.

31. The system of claim 24, the means for compiling uses attribute arguments to collect class members of a group of the one or more objects to generate underlying code of the group.

32. The system of claim 24, further comprising means for employing a number of top-level classes according to the application being developed.

* * * * *